Oct. 18, 1949.   A. B. WELTY, JR   2,485,342
METHOD FOR OXIDATION OF AROMATIC HYDROCARBONS
Filed Feb. 5, 1946

Albert B. Welty, Jr. Inventor
By _____ Attorney

Patented Oct. 18, 1949

2,485,342

UNITED STATES PATENT OFFICE 2,485,342

METHOD FOR OXIDATION OF AROMATIC HYDROCARBONS

Albert B. Welty, Jr., Mountainside, N. J., assignor to Standard Oil Development Company, a corporation of Delaware Application February 5, 1946, Serial No. 645,664

11 Claims. (Cl. 260—342)

This invention relates to an improved method and apparatus for the oxidation of aromatic hydrocarbons and pertains more particularly to the manufacture of phthalic anhydride.

The oxidation of aromatic hydrocarbons, such as naphthalene, and ortho xylene, alkyl derivatives of naphthalene to phthalic anhydride and maleic anhydride is a well-known process. In the usual process, a mixture of the aromatic hydrocarbon and air is passed through a bed of a granular oxide catalyst, such as vanadium oxide, contained in tubes maintained at a temperature of 570° to 1200° F. Because of the limited heat capacity of the reactant vapors it is necessary to remove most of the heat of reaction by heat exchange with a coolant, such as mercury or molten salt, flowing outside of the tubes; and because of the comparatively low heat conductivity of the catalyst, such tubes must be quite small, e. g. ⅝ inch in diameter and square in cross section. Obviously a reactor comprising such small tubes and designed for use with mercury or fused salts is expensive.

A further objection to the conventional tubular fixed bed oxidation reactor lies in the fact that because of heat transfer considerations, it is inherently impossible to obtain uniform temperature through the reaction zone.

It has been proposed that the first of the two above-mentioned problems can be minimized by including sufficient diluent, such as steam, with the inlet vapor to absorb the heat of reaction as sensible heat of the reactant gases. This process is described and claimed in copending application Serial No. 610,344 filed August 11, 1945.

The second of the two problems, that of achieving uniform reaction zone temperature can be met by employing a fluidized catalyst bed. This process is described and claimed in Serial No. 610,346, filed August 11, 1945.

However, it is difficult to adapt the conventional fluid catalyst technique to catalytic vapor phase oxidation as uniform exposure of vapors to the catalyst at the short contact time required is not readily achieved and catalyst attrition is a problem.

It is, therefore, the main object of this invention to provide a method and apparatus for the oxidation of aromatic hydrocarbons wherein uniform temperature of the catalyst is obtained without resort to expensive heat exchange equipment or the use of the fluid catalyst technique.

Other objects of the invention will be apparent as the detailed description proceeds.

In practicing this invention the oxidation of the aromatic hydrocarbons is effected by passing the vapors of the aromatic hydrocarbons through a wire gauze coated with vanadium oxide or other suitable catalyst and maintained under oxidizing conditions.

The invention will be more clearly understood from the following detailed description read in conjunction with the accompanying drawings, wherein.

Figure 1:
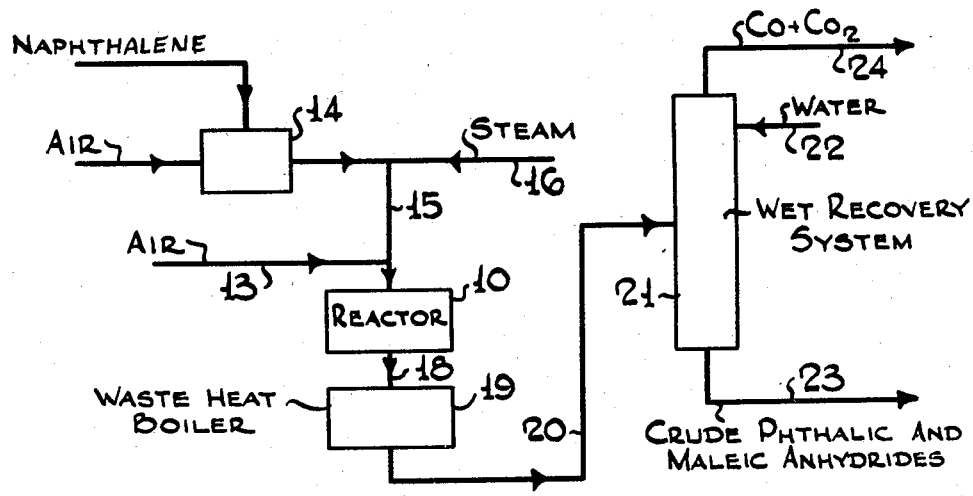
Figure 1 is a diagrammatic illustration in sectional elevation of one method of carrying out the invention showing the flow of material through the apparatus.
Figure 2:
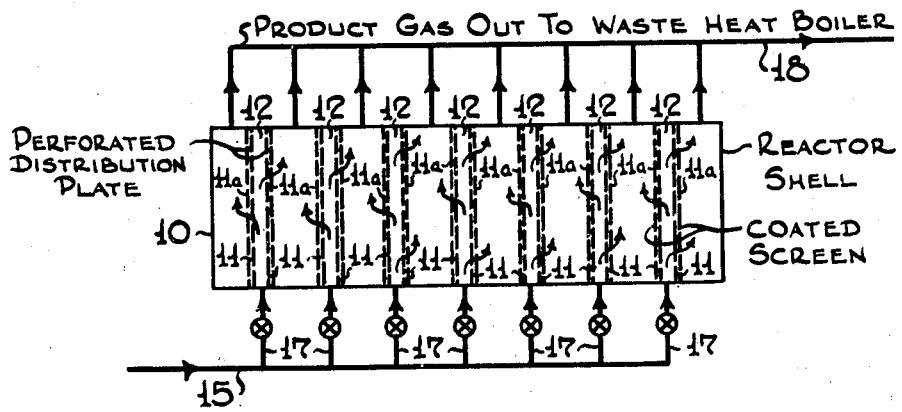
Figure 2 is a diagrammatic illustration in sectional elevation of one form of reactor used in the invention.

As charging stocks for the process of this invention, there may be used any suitable aromatic hydrocarbon or aromatic hydrocarbon stock such as coal tar distillates, refractory stocks produced by catalytic cracking or reforming, or pure aromatic hydrocarbons such as orthoxylene, naphthalene, alkyl naphthalenes, etc.

As catalysts for this process there may be employed 5th or 6th group metal oxides. Vanadium oxide is especially suitable.

Referring now to the drawing there is provided a reactor 10 in which there is placed a series of perforated plates 11, covered on the outside with screens 11a coated with the desired oxide catalyst, for example, vanadium oxide. The oxide catalyst may be deposited on the screen in any desirable manner, such as by chemical or electrolytic deposition, or by preparing the screen itself from the metal and then oxidizing the surface. For example, vanadium oxide coated screens may be prepared by electroplating a screen from an aqueous solution of ammonium vanadate. The screens are placed in the reactor so as to form a plurality of passageways 12 for introduction of the feed.

Air is introduced into the system through line 13 at a pressure of 15 to 30 lbs. per sq. in. ga. Naphthalene vapors plus air are introduced from vaporizer 14 through line 15 and mixed with the air in line 15 in amounts of about 0.5 to 2.0 mol per cent, preferably about 0.8 mol per cent naphthalene in total air. Low temperature steam, for example, refinery exhaust steam, or liquid water is introduced through line 16 and mixed with the air and naphthalene prior to their introduction into the reactor in such amounts that the sensible heat of the total mixture plus the latent heat of vaporization of liquid water present, if any, equals the heat of reaction at the desired temperature. At a feed concentration of 0.8 mol per cent naphthalene in air alone, about 50–65 mol per cent steam based on total inlet vapor will be required. The temperature in the reaction zone should be maintained between 800° and 1000° F., preferably about 1050° F. and may be closely controlled by varying the steam content of the inlet vapors. The vertical gas velocity in the reactor should be about 1 to 10 ft. per second, preferably 2 ft. per second. Remarkably close temperature control may thus be provided by varying the steam content.

The mixture of air, steam and naphthalene vapors are introduced into passageways 12 in reactor 10 through branch lines 17 and pass outwardly in all directions contacting the perforated screens 11a in so doing. Reaction takes place at those points where the air, steam and vapors contact screens coated with the catalyst. Heat conductivity through the wire screen is such that substantially uniform temperature is obtained over the entire catalyst surface, the steam acting to maintain the desired level.

Reaction products are removed from reactor 10 through line 18 and passed through waste heat boiler 19 or other heat exchanger and used to generate process steam. Cooled gases and reaction products are then introduced through line 20 to recovery tower 21 where they are scrubbed with water introduced through line 22. A solution of phthalic and maleic anhydrides is removed through line 23 and fixed gases are taken overhead through line 24. Relatively pure phthalic anhydride may be separated from the conversion products by conventional processes of distillation, crystallization, etc.

The following data illustrate the unexpected advantages obtained in the oxidation of naphthalene to form phthalic anhydride by the use of wire screen coated with vanadium oxide as the catalyst, in comparison with the results obtained with the ordinary fixed bed and with the fluid catalyst technique described in Serial No. 610,344.

| Operation | Commercial Fixed Bed | Fixed Bed Screen [1] V. Oxide | |
|---|---|---|---|
| Catalyst | Vanadium Oxide on Corundum | | |
| Feed Conc.—mol per cent of inlet vapor | 1 | 0.35 | 0.56 |
| Superficial Vapor Velocity—ft./sec | 15 | 0.6 | |
| Contact Time—Sec | 0.2 | 0.001 | 0.001 |
| Weight of Feed/Hr./Weight of catalyst | 0.6 | | |
| Temperature—° F | 850 | 1,050 | 1,050 |
| Product Distribution (Output Basis): | | | |
| Total Acids—mol per cent | 79 | 83 | 88.5 |
| Phthalic Anhydride | 76 | 75 | 80 |
| Maleic Anhydride | 3 | 8 | 8.5 |
| Net CO+CO$_2$—mol per cent | 9 | 4 | 4 |
| Conversion—per cent | 100 | 94 | 100 |
| Selectivity to Phthalic Anhydride—per cent | 76 | 80 | 80 |

[1] Vanadium oxide electrolytically deposited on 28 x 500 mesh KA2S screen.

The above data indicate that the yield of phthalic anhydride and selectivity obtained with the coated screen are better than the results obtained by commercial fixed bed operations while the amount of catalytic surface required to accomplish the desired reaction is surprisingly small. This latter fact results in considerable reactor simplification, only about 1530 sq. ft. of screen being needed to handle 35 tons of naphthalene per day. Such an amount of screen could easily be incorporated in a single reactor shell.

While one specific process embodying the novel steps of the present invention, as well as one specific apparatus for carrying out the same has been described in considerable detail, it is to be understood that this description is illustrative only, and for the purpose of making the invention more clear, and it is not intended that the invention shall be construed as limited to details of the description except in so far as such limitations have been included in the terms of the following claims in which it is the intention to claim all novelty inherent in the process according to the present invention.

What is claimed is:

1. The method of oxidizing naphthalene under controlled temperature conditions which comprises passing a mixture, comprising 0.5 to 2.0 mol percent of naphthalene vapor in air and water and maintaining controlled ratios of the components in said mixture whereby the sensible heat of the total mixture plus the latent heat of vaporization of the water equals the heat of reaction, over an oxidation catalyst comprising a wire screen coated with vanadium oxide at a rate of flow between 1 and 10 feet per second.

2. The method of partially oxidizing a vaporizable aromatic hydrocarbon under controlled temperature conditions which comprises passing 0.5 to 2.0 mol percent of said aromatic hydrocarbon in an oxidation gas through a wire screen coated with a vanadium oxide oxidation catalyst at a velocity of about 1 to 10 feet per second.

3. The method of partially oxidizing a vaporizable aromatic hydrocarbon under controlled temperature conditions which comprises passing 0.5 to 2.0 mol percent of said aromatic hydrocarbon in an oxidation gas through a wire screen coated with vanadium oxide at a velocity of about 1 to 10 feet per second.

4. The method of oxidizing naphthalene which comprises passing a mixture comprising between 0.5 to 2.0 mol percent of naphthalene vapor in air at a temperature between 900 and 1100° F. and at a vertical gas velocity of between 1 and 10 feet per second through a wire screen coated with vanadium oxide.

5. The method of oxidizing naphthalene comprising 0.8 mol percent of naphthalene vapor in air and 50 to 65 mol percent of steam based on total inlet vapor at a temperature of 1050° F. and a vertical gas velocity of 2 feet per second through a wire screen coated with vanadium oxide.

6. Process according to claim 2 in which the vaporizable aromatic hydrocarbon is naphthalene.

7. Process according to claim 2 in which the vaporizable aromatic hydrocarbon is orthoxylene.

8. Process according to claim 2 in which the vaporizable aromatic hydrocarbon is an alkyl naphthalene.

9. Process according to claim 3 in which the vaporizable aromatic hydrocarbon is naphthalene.

10. Process according to claim 3 in which the vaporizable aromatic hydrocarbon is orthoxylene.

11. Process according to claim 3 in which the vaporizable aromatic hydrocarbon is an alkyl naphthalene.

ALBERT B. WELTY, JR.

REFERENCES CITED

The following references are of record in the file of this patent:

UNITED STATES PATENTS

| Number | Name | Date |
|---|---|---|
| 1,376,665 | Backhaus | May 3, 1921 |
| 1,699,627 | Palmer | Jan. 22, 1929 |
| 1,900,715 | Jaeger | Mar. 7, 1933 |
| 1,914,557 | Craver | June 20, 1933 |
| 1,992,691 | Ellis | Feb. 26, 1935 |
| 2,010,086 | James | Aug. 6, 1935 |
| 2,064,468 | Foster | Dec. 15, 1936 |
| 2,142,678 | Porter | Jan. 3, 1939 |